US008908959B2

(12) United States Patent
Taguchi et al.

(10) Patent No.: US 8,908,959 B2
(45) Date of Patent: Dec. 9, 2014

(54) IMAGE PROCESSING APPARATUS

(75) Inventors: Yasunori Taguchi, Kanagawa (JP); Nobuyuki Matsumoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 911 days.

(21) Appl. No.: 13/069,605

(22) Filed: Mar. 23, 2011

(65) Prior Publication Data

US 2012/0070069 A1 Mar. 22, 2012

(30) Foreign Application Priority Data

Sep. 16, 2010 (JP) ................................ 2010-207831

(51) Int. Cl.
| | | |
|---|---|---|
| G06K 9/00 | (2006.01) | |
| G06K 9/36 | (2006.01) | |
| G06K 9/40 | (2006.01) | |
| G09G 5/02 | (2006.01) | |
| H04N 13/02 | (2006.01) | |
| G06T 7/00 | (2006.01) | |
| G06T 15/50 | (2011.01) | |
| H04N 13/00 | (2006.01) | |
| G06T 5/00 | (2006.01) | |
| H04N 1/409 | (2006.01) | |

(52) U.S. Cl.
CPC ......... *H04N 1/4092* (2013.01); *H04N 13/0239* (2013.01); *G06T 7/0075* (2013.01); *G06T 15/50* (2013.01); *H04N 13/0018* (2013.01); H04N 2013/0081 (2013.01); *G06T 5/008* (2013.01); G06T 2207/10028 (2013.01); *G06T 2207/30201* (2013.01); *G06K 9/00228* (2013.01); G06T 2207/10012 (2013.01)
USPC ............ 382/154; 382/274; 382/291; 345/591

(58) Field of Classification Search
None
See application file for complete search history.

(56) References Cited

U.S. PATENT DOCUMENTS

| | | | | |
|---|---|---|---|---|
| 6,157,733 | A * | 12/2000 | Swain | 382/154 |
| 6,496,598 | B1 * | 12/2002 | Harman | 382/154 |
| 6,900,799 | B2 * | 5/2005 | Takeuchi | 345/419 |
| 7,260,270 | B2 * | 8/2007 | Kusaka | 382/275 |
| 8,520,134 | B2 * | 8/2013 | Gomi et al. | 348/354 |

(Continued)

FOREIGN PATENT DOCUMENTS

| | | |
|---|---|---|
| JP | 2009-038794 | 2/2009 |
| JP | 2010-045457 | 2/2010 |

OTHER PUBLICATIONS

Jung, Jae-Ii, et al. "Improved depth perception of single-view images." Ecti Transactions on Electrical Eng., Electronics, and Communications 8 (2010): 164-172.*

(Continued)

*Primary Examiner* — Randolph I Chu
*Assistant Examiner* — Nathan Bloom
(74) *Attorney, Agent, or Firm* — Amin, Turocy & Watson, LLP

(57) ABSTRACT

According to one embodiment, an image processing apparatus includes a difference calculation unit, an intensity calculation unit, and an enhancing unit. The difference calculation unit calculates, for each partial area of an input image, a difference between a depth value of a subject and a reference value representing a depth as a reference. The intensity calculation unit calculates for each partial area an intensity, which has a local maximum value when the difference is 0 and has a greater value as the absolute value of the difference is smaller. The enhancing unit enhances each partial area according to the intensity to generate an output image.

16 Claims, 17 Drawing Sheets

(56) References Cited

U.S. PATENT DOCUMENTS

| | | |
|---|---|---|
| 2003/0071765 A1* | 4/2003 | Suyama et al. .................. 345/6 |
| 2005/0069194 A1* | 3/2005 | Kagitani ....................... 382/154 |
| 2006/0133667 A1* | 6/2006 | Schoelkopf et al. .......... 382/162 |
| 2006/0204034 A1* | 9/2006 | Steinberg et al. ............. 382/103 |
| 2007/0097207 A1* | 5/2007 | Toriumi ........................... 348/44 |
| 2007/0121094 A1* | 5/2007 | Gallagher et al. ............ 356/4.03 |
| 2007/0126921 A1* | 6/2007 | Gallagher et al. ............ 348/362 |
| 2008/0131019 A1* | 6/2008 | Ng ................................ 382/255 |
| 2008/0174605 A1* | 7/2008 | Kiuchi et al. ................. 345/531 |
| 2008/0240557 A1* | 10/2008 | Christie ........................ 382/167 |
| 2009/0022396 A1* | 1/2009 | Watanabe et al. ............. 382/167 |
| 2009/0034871 A1* | 2/2009 | Keshet et al. ................. 382/274 |
| 2010/0097476 A1* | 4/2010 | Marks ........................... 348/169 |
| 2011/0026051 A1* | 2/2011 | Wang ............................. 358/1.9 |
| 2011/0158504 A1* | 6/2011 | Turner et al. .................. 382/154 |
| 2012/0076433 A1 | 3/2012 | Ono et al. |

OTHER PUBLICATIONS

Japanese Office Action for Japanese Application No. 2010-207831 mailed on Aug. 14, 2012.

* cited by examiner

IMAGE PROCESSING APPARATUS

CROSS-REFERENCE TO RELATED APPLICATIONS

This application is based on claims the benefit of priority from the prior Japanese Patent Application No. 2010-207831, filed on Sep. 16, 2010; the entire contents of which are incorporated herein by reference.

FIELD

Embodiments described herein relate generally to an image processing apparatus which enhances an image.

BACKGROUND

An image processing apparatus is known in which an image is processed such that pixels having the degree of depth of near view are relatively conspicuous compared to pixels having the degree of depth of distant view, thereby improving the sense of depth or stereoscopic effect of the image.

However, in the related art, there is a problem in that the resultant image is unnatural. In capturing an image by a camera, light reaches a sensor through a lens. When a human being observes something, light reaches the retina through the cornea or crystalline lens serving as a lens. Thus, the most conspicuous portion in an image captured by a camera or an image observed through eyes of a human being is not necessarily the near view. That is, a conspicuous area of an image, which has been processed in the related art such that a near view portion therein is more conspicuous than the other portion, is different from that of an image, which is obtained when a camera is focused on a certain portion or is observed when a human being watches a certain portion. Therefore, such an image is unnatural.

DETAILED DESCRIPTION

In general, according to one embodiment, an image processing apparatus includes a difference calculation unit, an intensity calculation unit, and an enhancing unit. The difference calculation unit calculates, for each partial area of an input image, a difference between a depth value of a subject and a reference value representing a depth as a reference. The intensity calculation unit calculates for each partial area an intensity, which has a local maximum value when the difference is 0 and has a greater value as the absolute value of the difference is smaller. The enhancing unit enhances each partial area according to the intensity to generate an output image.

Hereinafter, embodiments of an image processing apparatus will be described in detail with reference to the accompanying drawings.

First Embodiment

An image processing apparatus according to a first embodiment enhances pixels in an image with strong intensity, the pixels having a depth that is close to a reference depth (reference value). With this, an image is generated in which a subject at a depth close to a reference value is distinctively (clearly) visible. Therefore, a person who views the generated image feels a sense of depth and a stereoscopic effect when viewing the subject.

Figure 1:
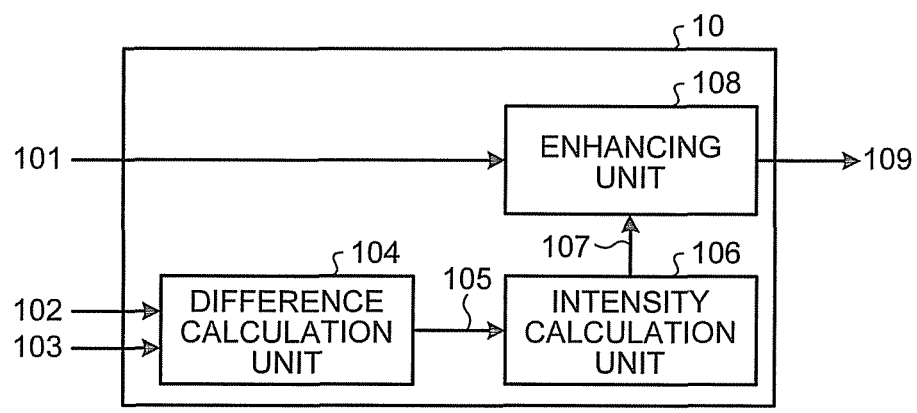
FIG. 1 is a block diagram of an image processing apparatus according to a first embodiment.
Figure 2:
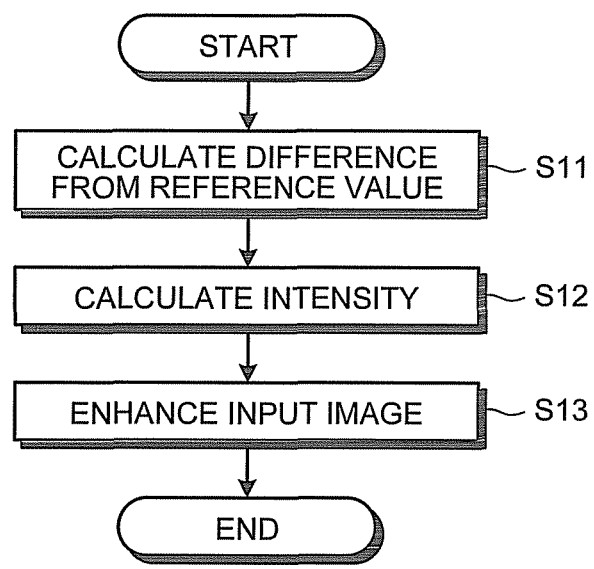
FIG. 2 is a flowchart of image enhancing process in the first embodiment.

FIG. 1 is a block diagram showing a configuration example of an image processing apparatus 10 according to the first embodiment. FIG. 2 is a flowchart showing the overall flow of an image enhancing process in the first embodiment. Hereinafter, the configuration and functions of the image processing apparatus 10 will be described with reference to FIGS. 1 and 2.

As shown in FIG. 1, the image processing apparatus 10 includes a difference calculation unit 104, an intensity calculation unit 106, and an enhancing unit 108. When an input image 101, depth data 102 (the details will be described below), and a reference value 103 which is a depth value as a reference are input, the image processing apparatus 10 outputs an output image 109.

The difference calculation unit 104 calculates the difference between the depth value of a captured subject and the reference value 103 for each partial area of the input image 101, and outputs difference data 105. The intensity calculation unit 106 calculates intensity, which has a local maximum value when the calculated difference is 0 and has a greater value as the absolute value of the difference is smaller, for each partial area. The enhancing unit 108 generates and outputs the output image 109 in which the input image 101 is enhanced with the calculated intensity for each partial area.

Figure 3:
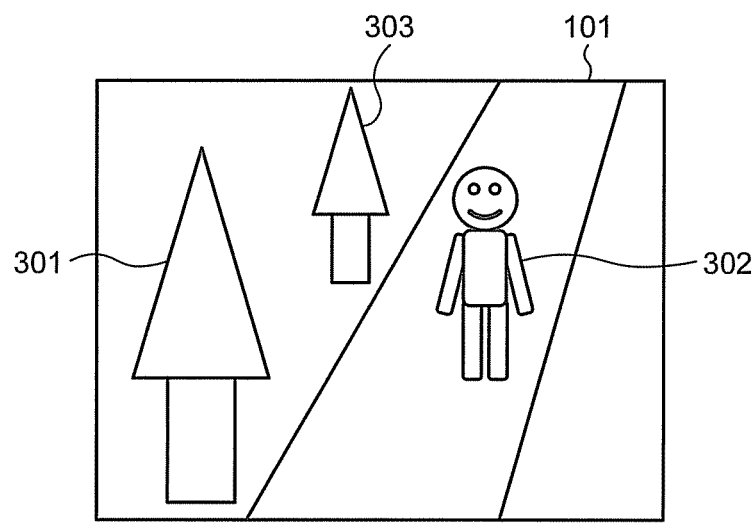
FIG. 3 is a diagram showing an example of an input image.

FIG. 3 is a diagram showing an example of the input image 101. FIG. 3 shows an example of an image in which a character 302 stands on a road and trees 301 and 303 stand along the road. In the entire input image 101, a lowermost screen portion is nearest and an uppermost screen portion is farthest from the viewpoint of a camera or eyes of a human being. In the subjects including the tree 301, the character 302, and the tree 303, the tree 301 is nearest the viewpoint, the character 302 is second nearest the viewpoint, and the tree 303 is farthest from the viewpoint. All of the tree 301, the character 302, and the tree 303 are distant from the viewpoint compared to the lowermost screen portion of the input image 101 and are near the viewpoint compared to the uppermost screen portion of the input image 101.

As shown in FIG. 2, in Step S11, when the depth data 102 and the reference value 103 are input to the difference calculation unit 104, the difference calculation unit 104 calculates the difference data 105 and sends the difference data 105 to the intensity calculation unit 106. The depth data 102 is data which has the depth value of a subject for each partial area of the input image 101. Hereinafter, a case will be described where a partial area is the pixel of the input image 101, and the depth value is a value which represents the distance from the viewpoint.

Figure 4:
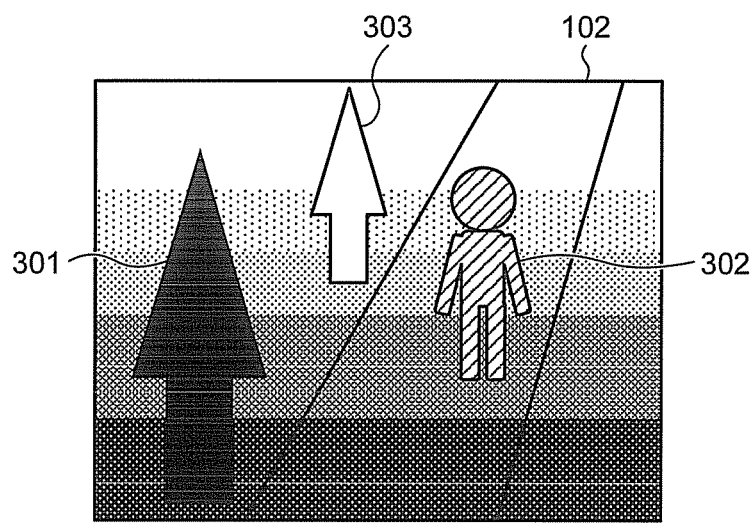
FIG. 4 is a diagram showing an example of depth data.

FIG. 4 is a diagram showing an example of the depth data 102. In FIG. 4, a portion having a great hatched density has a small depth value and is near the viewpoint. A portion having a small hatched density has a great depth value and is distant from the viewpoint. In FIG. 4, for convenience of description, the depth value of a background portion including the road is described in four stages. Actually, the depth value of the road continuously increases toward the uppermost screen portion. The same is applied to FIGS. 10 and 11 described later.

Figure 5:
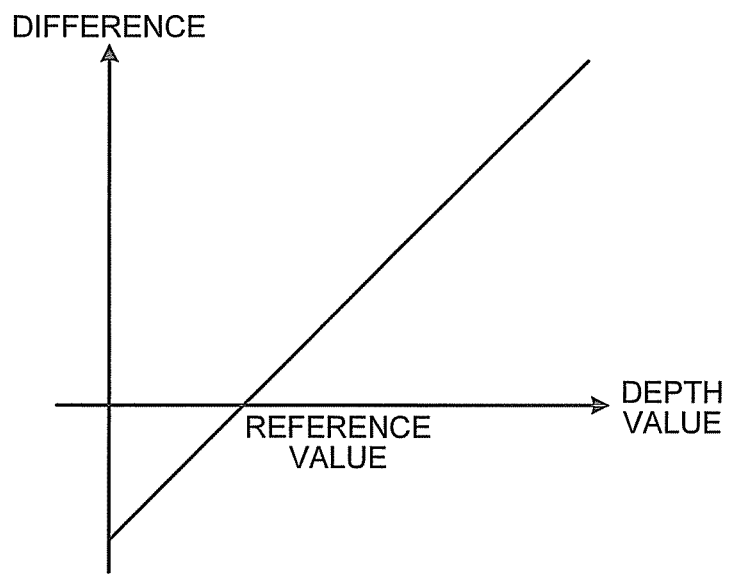
FIG. 5 is a diagram showing a relationship between a depth value, a reference value, and a difference.

The difference data 105 is calculated by subtracting the reference value 103 from the depth value of each pixel in the depth data 102 and has the value of difference for each pixel. FIG. 5 is a diagram showing the relationship between the depth value, the reference value 103, and the difference.

Returning to FIG. 2, in Step S12, when the difference data 105 is input to the intensity calculation unit 106, the intensity calculation unit 106 calculates intensity data 107 from the difference data 105 and sends the intensity data 107 to the enhancing unit 108. The intensity data 107 is calculated from the difference data 105 and has the value of intensity for each pixel. The intensity of each pixel is calculated to be greater as the absolute value of the value of difference of the pixel in difference data 105 is smaller, and is calculated to be smaller as the absolute value of difference is greater. Even if the absolute value of the difference is the same, the value of intensity may be calculated to be greater when the difference is positive than when the difference is negative.

Figure 6:
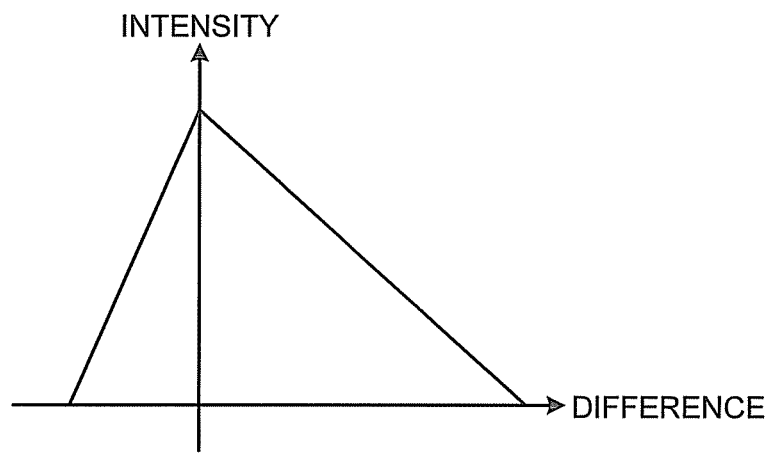
FIG. 6 is a diagram showing an example of a relationship between the value of a difference and intensity.
Figure 7:
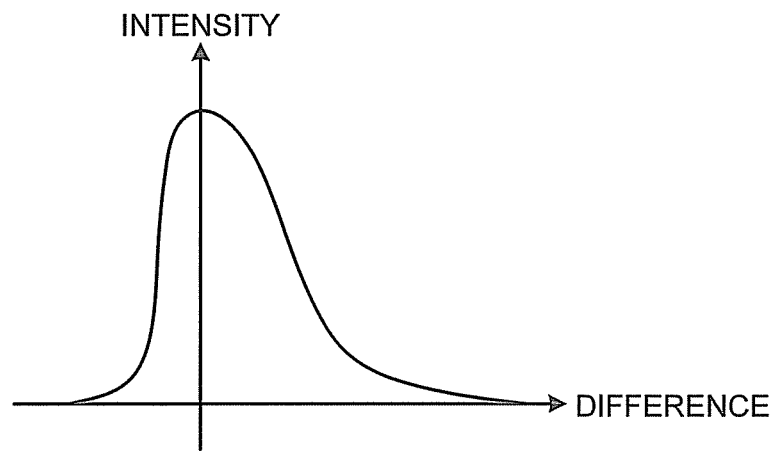
FIG. 7 is a diagram showing an example of a relationship between the value of a difference and intensity.

The value of intensity of each pixel is calculated by, for example, the value of difference of the pixel in difference data 105 and a function or a table which defines the relationship between the value of difference and the intensity. FIGS. 6 and 7 are diagrams showing the relationship between the value of difference and the intensity. The intensity calculation unit 106 may calculate intensity by a function which represents the relationship of FIG. 6 or 7 or may calculate intensity by a table which represents the relationship of FIG. 6 or 7. When the calculation is performed using the function, it is not necessary to provide a memory for holding a table. When the calculation is performed using the table, the cost for computing the value of the function can be eliminated.

Figure 8:
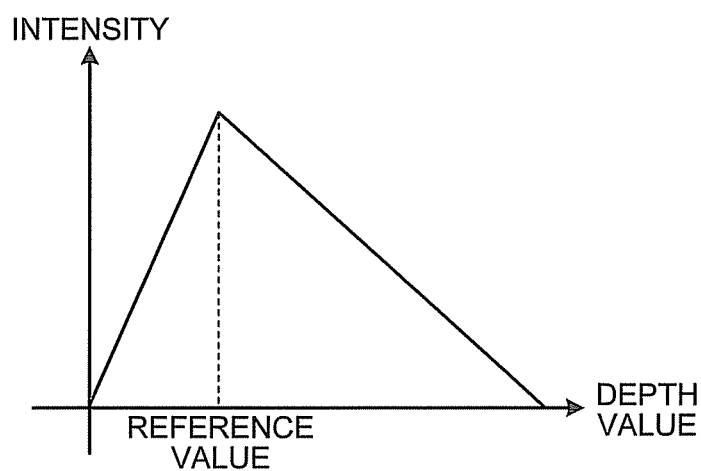
FIG. 8 is a diagram showing an example of a relationship between a depth value and intensity.
Figure 9:
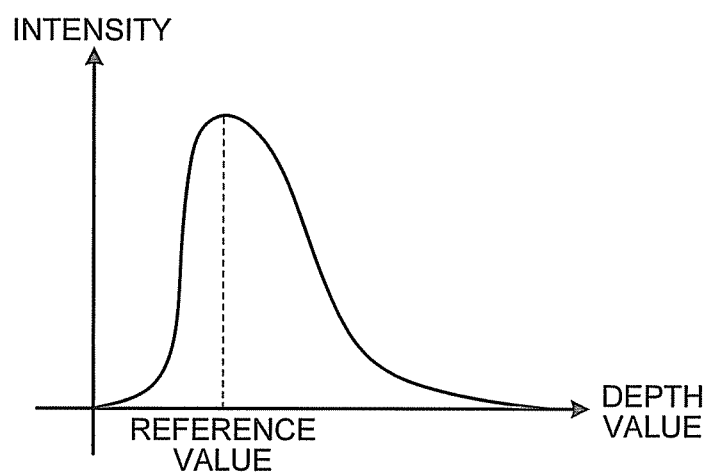
FIG. 9 is a diagram showing an example of a relationship between a depth value and intensity.

The value of intensity of each pixel may be calculated by a function or a table which defines the relationship between the depth value, the reference value, and the intensity. FIGS. 8 and 9 are diagrams showing an example of the relationship between the depth value and the intensity. The calculation of the intensity using the difference and the relationship of FIG. 6 is equivalent to the calculation of the intensity using the depth value, the reference value 103, and the relationship of FIG. 8. The calculation of the intensity using the difference and the relationship of FIG. 7 is equivalent to the calculation of the intensity using the depth value, the reference value 103, and the relationship of FIG. 9.

As shown in FIGS. 8 and 9, the value of intensity of a pixel having the same depth value as the reference value 103 has a local maximum value. The value of intensity of a pixel having a depth behind the reference value 103 is greater than the intensity of a pixel having the same absolute value of the difference and a depth ahead of the reference value 103.

Figure 10:
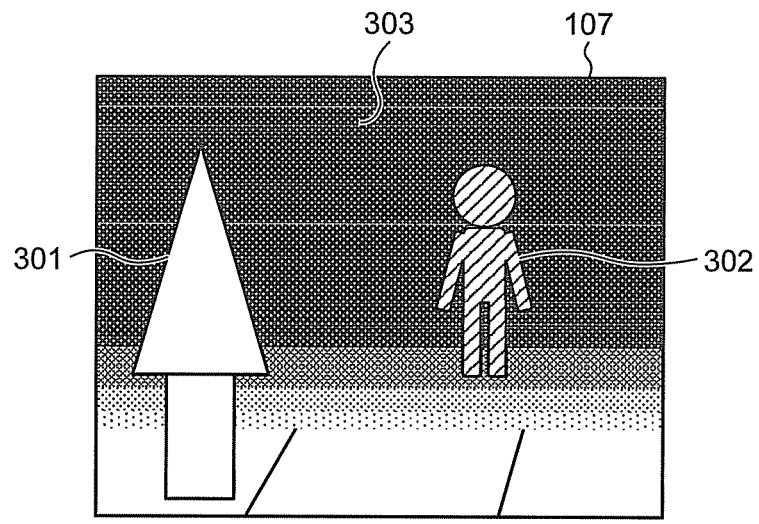
FIG. 10 is a diagram showing an example of intensity data when a reference value is identical to the depth value of a tree.

FIG. 10 is a diagram showing an example of the intensity data 107 in which the reference value 103 is identical to the depth value of the tree 301. In FIG. 10, a portion having a small hatched density has a great value of intensity, and a portion having a great hatched density has a small value of intensity. As shown in FIG. 10, the value of intensity is greater as the depth is closer to the depth of the tree 301.

Figure 11:
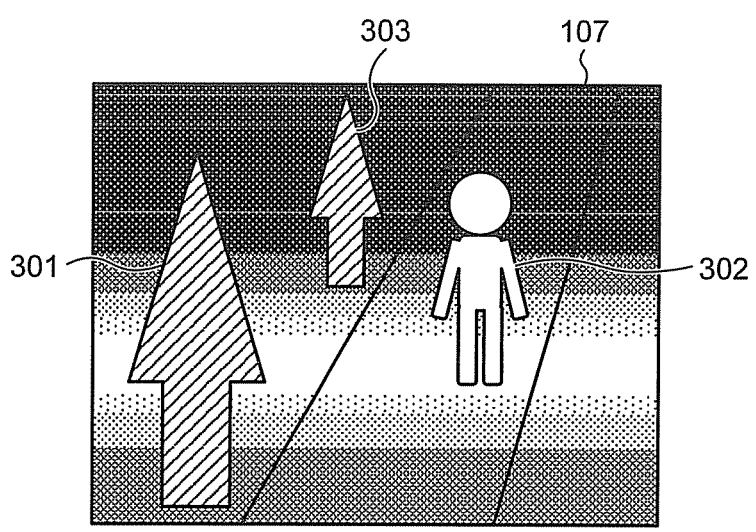
FIG. 11 is a diagram showing an example of intensity data when a reference value is identical to the depth value of a character.

FIG. 11 is a diagram showing an example of intensity data 107 in which the reference value 103 is identical to the depth value of the character 302. In this case, as shown in FIG. 11, the value of intensity is greater as the depth is closer to the depth of the character 302.

Returning to FIG. 2, in Step S13, when the input image 101 and the intensity data 107 are input to the enhancing unit 108, the enhancing unit 108 generates and outputs the output image 109 in which the input image 101 is enhanced with intensity data 107.

The output image 109 is generated by enhancing at least one of the brightness and saturation of the input image 101 on the basis of the intensity data 107. In enhancing, for example, a sharpening filter, such as an unsharp mask filter or a Laplacian filter, is used. The collection of pixels which is referenced in enhancing the value of a target pixel, a pixel to be processed by the sharpening filter is predefined. The collection of pixels to be referenced is, for example, a set of three pixels in each of the longitudinal and lateral directions horizontal centering on the target pixel.

Figure 12:
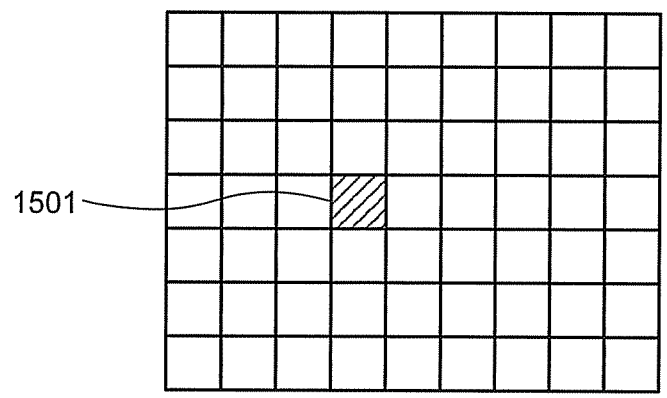
FIG. 12 is a diagram showing an example of a target pixel.
Figure 13:
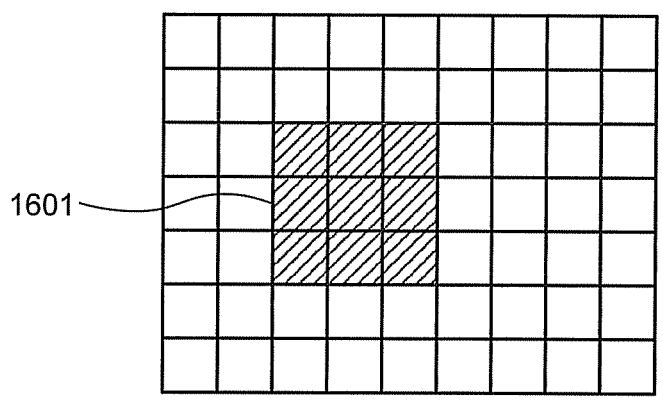
FIG. 13 is a diagram showing an example of a collection of pixels which is referenced in enhancing the target pixel of FIG. 12.

FIG. 12 is a diagram showing an example of a target pixel. FIG. 13 is a diagram showing an example of the collection of pixels which is referenced in enhancing the target pixel of FIG. 12. When a pixel 1501 of FIG. 12 is a target pixel, a pixel set 1601 of FIG. 13 is a pixel set to be referenced. The collection of pixels to be referenced is not limited thereto. The intensity of the sharpening filter varies depending on the pixels. As the intensity, the value of intensity of each pixel in intensity data 107 is used.

Figure 14:
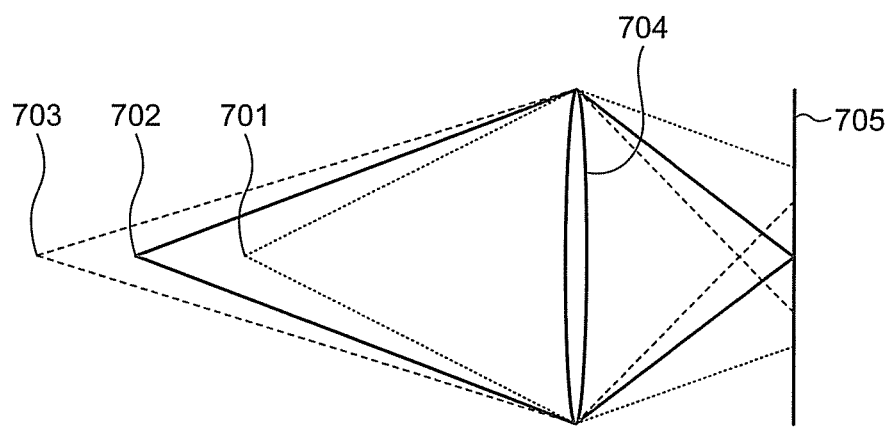
FIG. 14 is a diagram showing an example of a positional relationship between a lens and a subject.

In an image captured by a camera, the depth of a subject which is distinctively visible and the depth of a subject which is not distinctively visible will be described in connection with an example of FIG. 14. FIG. 14 is a diagram showing an example of the positional relationship between a lens and a subject.

In the example of FIG. 14, a position 702 is focused on a surface 705 on which a lens 704 and a sensor are arranged. The distance from the position 702 to a position 701 is identical to the distance from the position 702 to a position 703. Light from a subject at the position 702 converges on one point on the surface 705 and is thus observed distinct in the captured image. Light from a subject at the position near the lens 704 has spread on the surface 705 and is thus blurredly (unclearly) visible in the captured image. Light from a subject at the position 703 distant from the lens 704 compared to the position 702 has spread on the surface 705 and is thus blurredly visible in the captured image. The spread is narrower than light from a subject at the position 701. From FIG. 14, it is recognized that a subject having a focused depth is distinctively visible and the subject is conspicuous. It is recognized that a subject having a defocused depth is blurredly visible, and the subject is inconspicuous. Even when the distance from the focused depth is the same, it is recognized that a subject near the viewpoint is blurredly visible compared to a subject distant from the viewpoint.

As described above, according to the image processing apparatus 10 of the first embodiment, it is possible to enhance an image with strong intensity for a pixel having a depth close to the reference value 103. For this reason, an image is generated in which a subject at a depth close to the reference value 103 is distinctively visible. In an image which is obtained when the camera is focused to a certain portion, a subject at the depth is distinctively visible and thus conspicuous. Since the cornea and crystalline lens of the human being serves as a lens and the retina serves as a sensor, the same is applied when a person watches a certain portion. Therefore, a person who views the output image 109 generated by the image processing apparatus 10 of this embodiment feels a sense of depth and a stereoscopic effect when an object at the reference value 103 is watched.

It might be possible to impart a sense of depth or a stereoscopic effect by gradating an image; however, gradating an image is not necessarily desired by a person who views an image. In this embodiment, enhancing is done regardless of whether an image is gradated or not, such that a sense of depth and a stereoscopic effect are imparted when an object at the reference value 103 is watched.

Modification Relating to Partial Area

A case has heretofore been described where depth data 102 has a depth value in units of pixels of the input image 101. A partial area may not be the pixel of the input image 101. For example, the partial area may be a set of pixels of the input image 101. In this case, data which is obtained by interpolating the depth value of each pixel may be defined as depth data 102. Furthermore, the partial area may be an area smaller than the pixel of the input image 101. In this case, data obtained by integrating the depth value of each area, which is smaller than the pixel of the input image 101, and generating the depth value of each pixel may be defined as depth data 102. This modification also has the same effects as in the first embodiment.

Modification Relating to Depth Value

A case has heretofore been described where the depth value increases as the distance from the viewpoint is greater. In this case, as the distance from the viewpoint is smaller, the depth value is smaller. To the contrary, a form may be used in which, as the distance from the viewpoint is smaller, the depth value increases. In this case, the above-described process may be applied while the magnitude of the value is inverted. This modification also has the same effects as in the first embodiment.

Modification Relating to Enhancing

An example has heretofore been described where the sharpening filter is used to enhance an image. The brightness or saturation may be enhanced through image processing other than the sharpening filter. For example, at least one of the brightness and saturation of an image may be enhanced through gradation correction using a tone curve.

Figure 15:
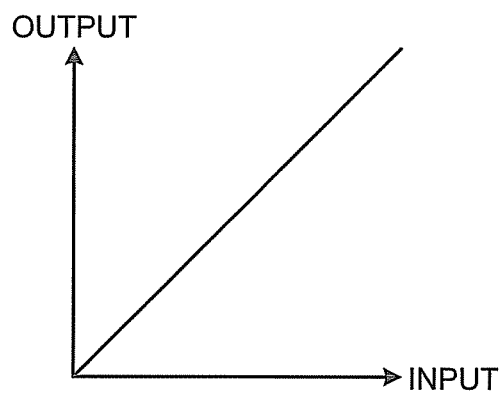
FIG. 15 is a diagram showing an example of a tone curve for use in enhancing.
Figure 16:
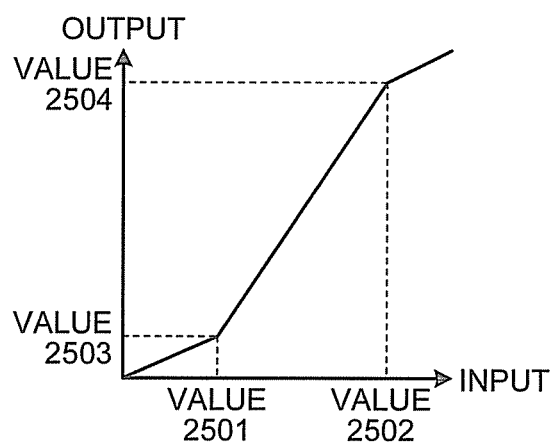
FIG. 16 is a diagram showing an example of a tone curve for use in enhancing.
Figure 17:
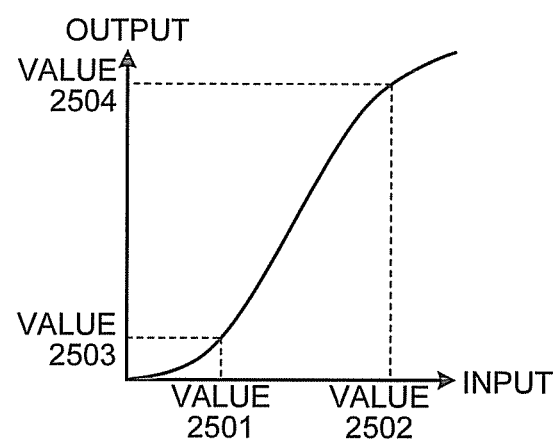
FIG. 17 is a diagram showing an example of a tone curve for use in enhancing.

FIGS. 15 to 17 are diagrams showing examples of the tone curve for use in enhancing. In FIGS. 15 to 17, the horizontal axis represents the brightness or saturation of an input, and the vertical axis represents the brightness or saturation of an output. The tone curve of FIG. 15 is an example of a tone curve which is not used in enhancing. This tone curve is a straight line which as an intercept of 0 and a slop of 1 and in which an output to a certain input coincides with the input. For example, the output image 109 which is generated through gradation correction using the tone curve of FIG. 15 coincides with the input image 101, and a portion having a depth close to the reference value 103 is not enhanced.

In order to enhance a set of pixels having a depth close to the reference value 103, a tone curve which has a slope greater than 1 in that portion is used. For description, it is assumed that the value of brightness or saturation of a portion having a depth close to the reference value 103 is mainly from a value 2501 to a value 2502 of FIGS. 16 and 17. In this case, for example, a tone curve shown in FIG. 16 or 17 is used.

In the example of FIG. 16 or 17, the slop is greater than 1 in the range of the value 2501 to the value 2502. In a portion in which the input is from the value 2501 to the value 2502, an output is converted to a range of a value 2503 to a value 2504. Since the range of the value 2503 to the value 2504 is wider than the range of the value 2501 to the value 2502, the contrast of a set of pixels having a depth close to the reference value 103 is enhanced. The value 2501 and the value 2502 are determined from, for example, a histogram which represents the brightness or saturation of a pixel having the difference from the reference value 103 being a depth value within a threshold value.

Figure 18:
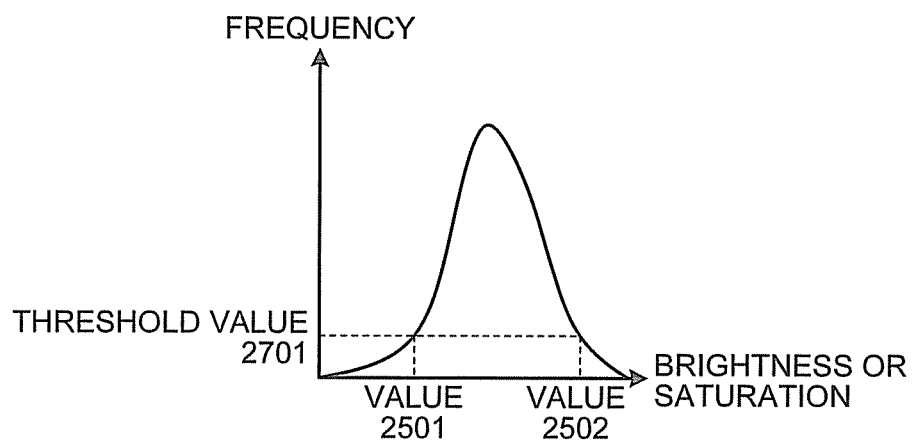
FIG. 18 is a diagram showing an example of a histogram of brightness or saturation.

FIG. 18 is a diagram showing an example of a histogram of brightness or saturation. In the example of FIG. 18, when the frequency of a histogram is a threshold value 2701, the brightness or saturation is determined as the value 2501 and the value 2502.

For simplification of description, a modification has been described in which an image is enhanced through gradation correction using a single tone curve. In contrast, a configuration may be made such that an image is divided into partial images, and different tone curves are used for the divided partial images. Thus, the histogram relating to the brightness or saturation of a set of pixels having a depth when the difference from the reference value 103 is within a threshold value is enhanced finely for each, partial image.

Figure 19:
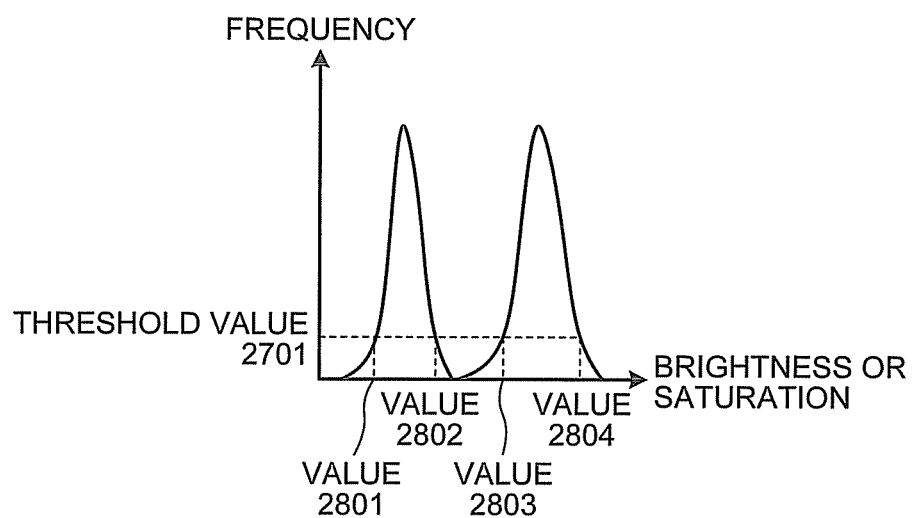
FIG. 19 is a diagram showing an example of a histogram of brightness or saturation.
Figure 20:
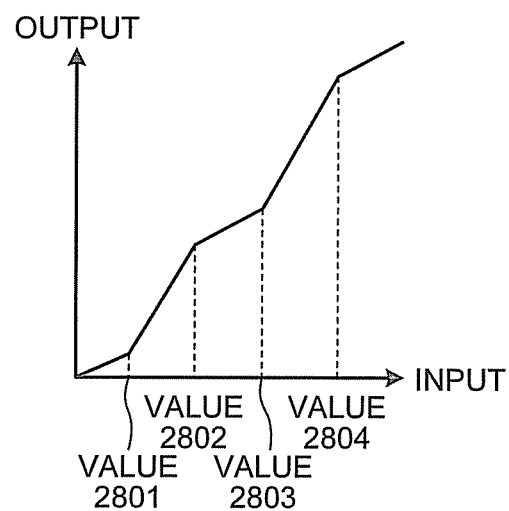
FIG. 20 is a diagram showing an example of a tone curve for use in enhancing.

With regard to the shape of a tone curve, the number of portions having a slope greater than 1 is not limited to one. For example, when there is a plurality of subjects having a depth value close to the reference value 103, as shown in FIG. 19, there may be a case where a histogram has a plurality of peaks. In this case, like a tone curve shown in FIG. 20, there may be a plurality of portions having a slope greater than 1. That is, a tone curve (FIG. 20) having a slope greater than 1 may be used in a range of a value 2801 to a value 2802 when the frequency coincides with the threshold value 2701 in FIG. 19 and a range of a value 2803 to a value 2804.

Figure 21:
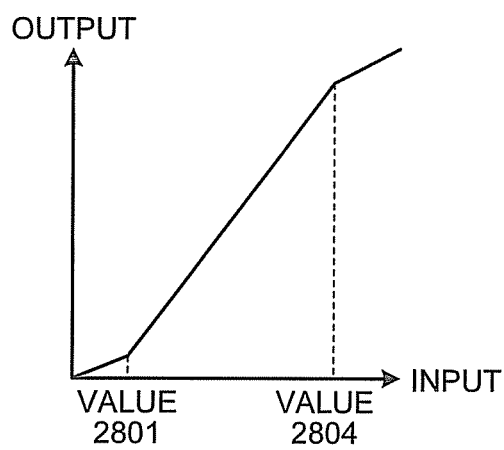
FIG. 21 is a diagram showing an example of a tone curve for use in enhancing.

Of course, like a tone curve shown in FIG. 21, there may be a single portion having a slope greater than 1. In any cases, the histogram relating to the brightness or saturation of a set of pixels having a depth when the difference from the reference value 103 is within a threshold value is enhanced.

Second Embodiment

An image processing apparatus according to a second embodiment reduces the value of intensity which enhances a pixel at the boundary between objects or at the boundary between sites having a great difference in depth of an object having distinct irregularities. Therefore, it is possible to suppress a shoot of the sharpening filter.

Figure 22:
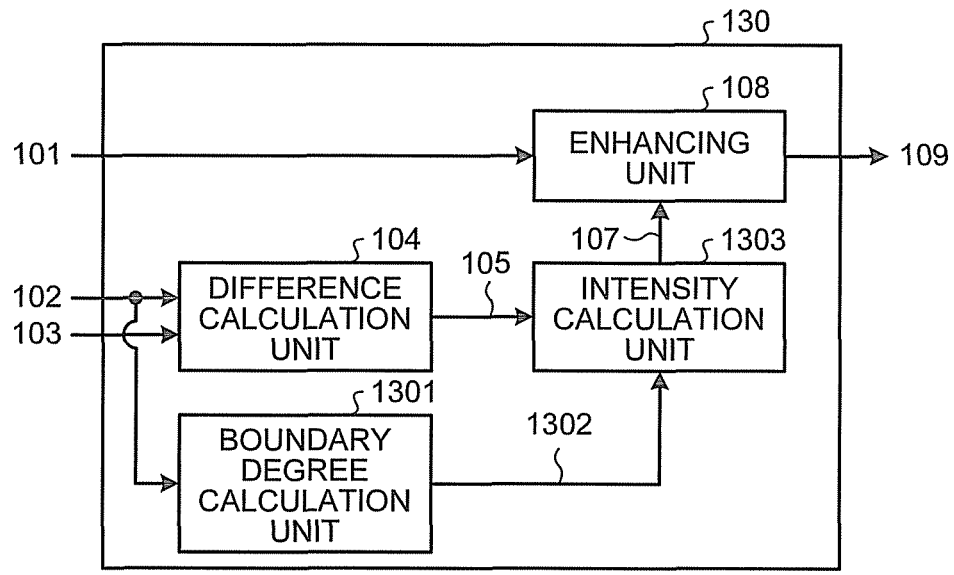
FIG. 22 is a block diagram of an image processing apparatus according to a second embodiment.
Figure 23:
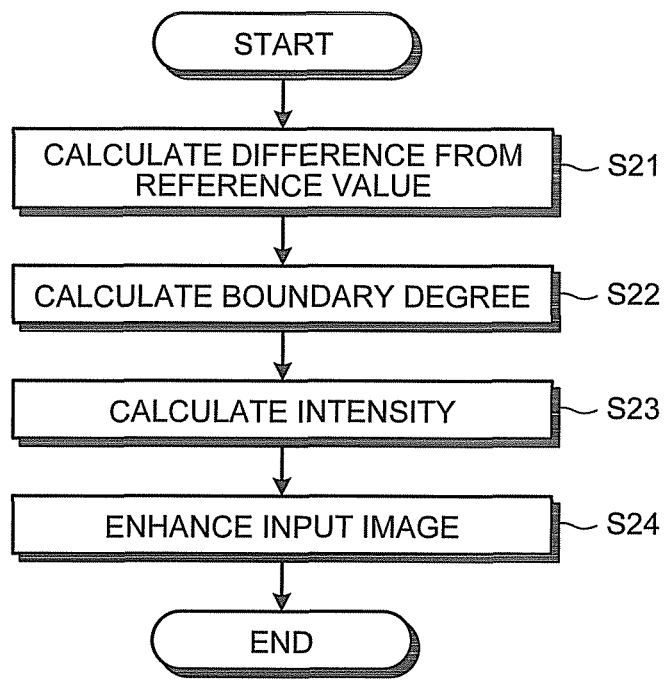
FIG. 23 is a flowchart of image enhancing process in the second embodiment.

FIG. 22 is a block diagram showing a configuration example of an image processing apparatus 130 according to the second embodiment. FIG. 23 is a flowchart showing the overall flow of an image enhancing process in the second embodiment. Hereinafter, the configuration and function of the image processing apparatus 130 will be described with reference to FIGS. 22 and 23.

As shown in FIG. 22, the image processing apparatus 130 includes a difference calculation unit 104, a boundary degree calculation unit 1301, an intensity calculation unit 1303, and an enhancing unit 108. When an input image 101, depth data 102, and a reference value 103 are input, the image processing apparatus 130 outputs an output image 109.

The second embodiment is different from the first embodiment in that the boundary degree calculation unit 1301 is further provided, and the intensity calculation unit 1303 has a different function. Other parts and functions are the same as those shown in FIG. 1, which is the block diagram of the image processing apparatus 10 according to the first embodiment. Thus, the same parts are represented by the same reference numerals, and description thereof will not be repeated.

The boundary degree calculation unit 1301 calculates a boundary degree, which has a greater value as the difference between the depth value of a partial area and the depth value of a peripheral area of the partial area is greater, for each partial area (pixel). The intensity calculation unit 1303 calculates intensity, which has a local maximum value when the calculated difference is 0, has a greater value as the absolute value of the difference is smaller, and has a greater value as the boundary degree is smaller, for each partial area.

Steps S21 and Step S24 of FIG. 23 are the same as Steps S11 and S13 of FIG. 2, thus description thereof will not be repeated. In Step S22, when depth data 102 is input to the boundary degree calculation unit 1301, the boundary degree calculation unit 1301 calculates boundary degree data 1302 and sends the boundary degree data 1302 to the intensity calculation unit 1303. The boundary degree data 1302 is data which, for each pixel, has the value of boundary degree representing whether or not the pixel is at the boundary between objects having a difference in depth, and is calculated from the depth data 102.

A method of calculating the boundary degree will be described with reference to FIGS. 12 and 13 described above. The value of boundary degree in the pixel 1501 of FIG. 12 is calculated from the depth value of each pixel in the pixel set 1601 of FIG. 13, which is referenced when the enhancing unit 108 processes the pixel 1501, and the depth value of the pixel 1501. For example, the boundary degree calculation unit 1301 first calculates the difference between the depth value in depth data 102 of each pixel in the pixel set 1601 and the depth value in depth data 102 of the pixel 1501. The boundary degree calculation unit 1301 calculates the maximum value out of the absolute values of the difference calculated for the pixels in the pixel set 1601 as the value of boundary degree of the pixel 1501. The great value of boundary degree of the pixel 1501 indicates that the pixel 1501 is at the boundary between different objects or at the boundary between sites having a great difference in depth of an object having distinct irregularities.

Returning to FIG. 23, in Step S23, when the difference data 105 and the boundary degree data 1302 are input to the intensity calculation unit 1303, the intensity calculation unit 1303 calculates the intensity data 107 and sends the intensity data 107 to the enhancing unit 108. The intensity data 107 is calculated from the difference data 105 and the boundary degree data 1302, and has the value of intensity for each pixel. The intensity of each pixel is calculated to be greater as the absolute value of the value of different of the pixel in the difference data 105 is smaller, is calculated to be smaller as the absolute value of the value of difference is greater, and is calculated to be smaller as the value of boundary degree of the pixel in the boundary degree data 1302 is greater. The intensity of each pixel is calculated to be greater as the absolute value of the value of difference of the pixel in the difference data 105 is smaller and to be smaller as the absolute value of the value of difference is greater, and is calculated to be smaller as the value of boundary degree of the pixel in the boundary degree data 1302 is greater and to be greater as the value of boundary degree in the boundary degree data 1302 is smaller.

When the value of difference and the value of boundary degree are input, the value of intensity is calculated by a function which outputs the value of intensity. Alternatively, when the value of difference and the value of boundary degree are input, the value of intensity is calculated by a table which outputs the value of intensity. When the calculation is performed using the function, it is not necessary to provide a memory for holding a table. When the calculation is performed using the table, the cost for computing the value of the function can be eliminated.

The intensity calculation unit 1303 is different from the intensity calculation unit 106 of the first embodiment in that, when the boundary degree of a certain pixel in the boundary degree data 1302 represents the boundary between objects or the boundary between sites having a great difference in depth of an object having distinct irregularities, the value of intensity of the pixel is reduced.

Figure 24:
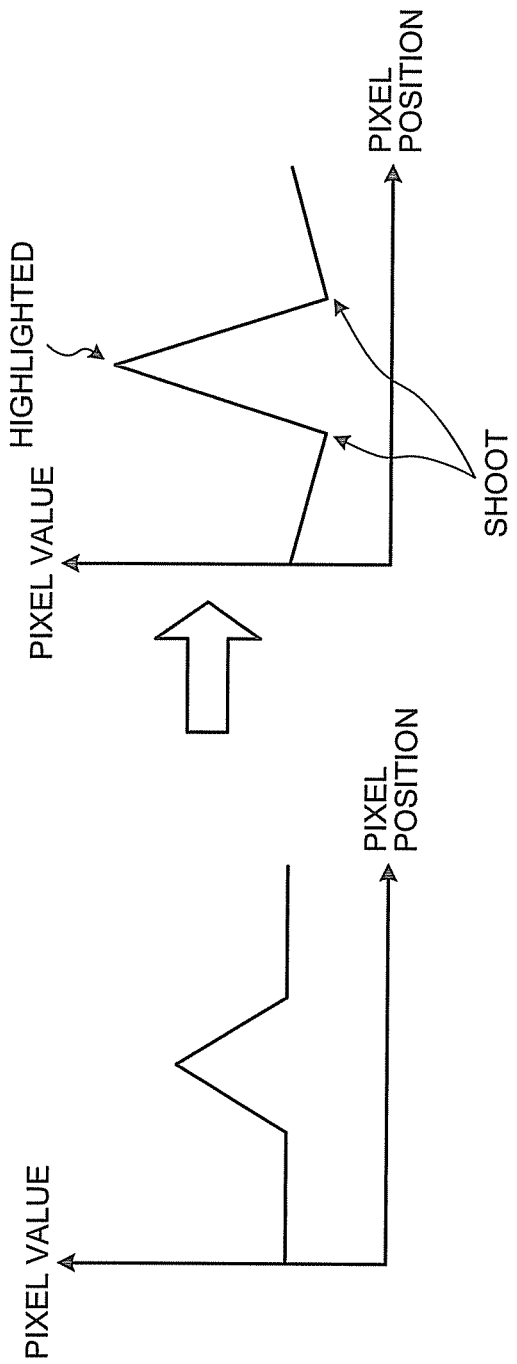
FIG. 24 is a diagram illustrating a shoot which is made because of enhancing.

As described above, in the image processing apparatus 130 of the second embodiment, the intensity when a pixel having a great boundary degree is enhanced is reduced. Thus, there is the effect of suppressing a shoot of the sharpening filter. Hereinafter, the suppression effect will be described. FIG. 24 is a diagram illustrating a shoot which is generated because of enhancing.

In the sharpening filter, the value of a pixel, such as brightness or saturation, is enhanced. The enhancing is realized by separating the value of a target pixel from a representative value of the value of a peripheral area (peripheral reference pixel) of the target pixel. The left side of FIG. 24 is an example which represents the relationship between the position of a pixel in the cross-section of an image before enhancing and the value (brightness or saturation) of the pixel. Meanwhile, the right side of FIG. 24 is an example which represents the relationship between the positions of pixels in the cross-section of an image after all pixels are enhanced with uniform intensity and the value (brightness or saturation) of the pixel.

As shown in FIG. 24, the peak of the value of a pixel in an image before enhancing is enhanced. The right side of FIG. 24 shows a case where a peak which does not exist in an image before enhancing is generated. This is called a shoot. Thus, with image enhancing, the texture of an object surface is sharpened, but a shoot which is perceived as an obtrusive artifact at the boundary between objects or at the boundary between sites having a great difference in depth of an object having distinct irregularities is generated.

In the second embodiment, the boundary degree which increases at the boundary between objects or at the boundary between sites having a great difference in depth of an object having distinct irregularities is calculated, and the intensity of enhancing is weakened as the boundary degree is great. For this reason, it is possible to suppress the occurrence of a shoot at the boundary. Furthermore, the second embodiment also has the same effects as in the first embodiment.

Modification Relating to Method of Calculating Boundary Degree

An example has heretofore been described where the difference between the depth value in the depth data 102 of each pixel in the pixel set 1601 and the depth value in the depth data 102 of the pixel 1501 is calculated, and the maximum value of the absolute value of the difference is calculated as the value of boundary degree of the pixel 1501. The method of calculating a boundary degree is not limited thereto. For example, the difference between the depth value in the depth data 102 of each pixel in the pixel set 1601 and the depth value in the depth data 102 of the pixel 1501 may be calculated, and the maximum value of a square of the difference may be calculated as the value of boundary degree of the pixel 1501. The difference between the depth value in the depth data 102 of each pixel in the pixel set 1601 and the depth value in the depth data 102 of the pixel 1501 may be calculated, and the sum of the absolute values or squares of the difference may be calculated as the value of boundary degree of the pixel 1501. In any cases, the same effects as the embodiment are obtained.

Third Embodiment

An image processing apparatus according to a third embodiment sets the depth value of a reference subject designated by the user as a reference value. Thus, a sense of depth and a stereoscopic effect are imparted to the user in such a manner that the user watches a subject desired to watch.

Figure 25:
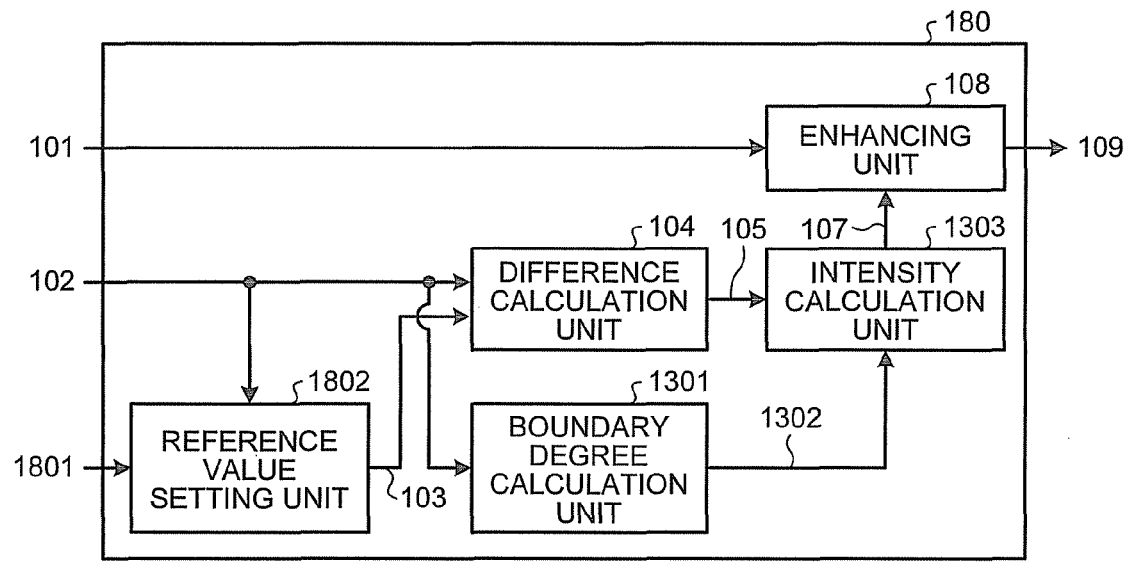
FIG. 25 is a block diagram of an image processing apparatus according to a third embodiment.
Figure 26:
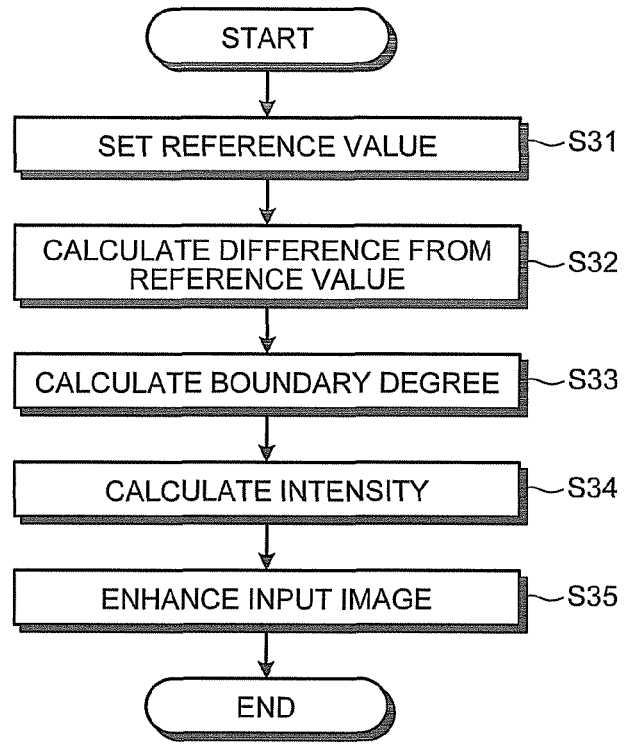
FIG. 26 is a flowchart of image enhancing process in the third embodiment.

FIG. 25 is a block diagram showing a configuration example of an image processing apparatus 180 according to the third embodiment. FIG. 26 is a flowchart showing the overall flow of an image enhancing process in the third embodiment. Hereinafter, the configuration and function of the image processing apparatus 180 will be described with reference to FIGS. 25 and 26.

As shown in FIG. 25, the image processing apparatus 180 includes a reference value setting unit 1802, a difference calculation unit 104, a boundary degree calculation unit 1301, an intensity calculation unit 1303, and a enhancing unit 108. When an input image 101, depth data 102, and a reference subject 1801 are input, the image processing apparatus 180 outputs an output image 109.

The third embodiment is different from the second embodiment in that the reference value setting unit 1802 is further provided. Other parts and functions are the same as those shown in FIG. 22, which is the block diagram of the image processing apparatus 130 according to the second embodiment. Thus, the same parts are represented by the same reference numerals, and description thereof will not be repeated.

The reference value setting unit 1802 sets the depth value of a reference subject 1801 designated as a reference out of subjects in the input image 101 as a reference value.

As shown in FIG. 26, in Step S31, when the depth data 102 and the reference subject 1801 are input to the reference value setting unit 1802, the reference value setting unit 1802 sets a reference value 103 and sends the reference value 103 to the difference calculation unit 104. Steps S32 to S35 are the same as Steps S21 to Step S24 of FIG. 23, thus description thereof will not be repeated.

The reference subject 1801 is data which specifies the position or region of a subject to be enhanced in the input image 101. For example, the reference subject 1801 is coordinate data which represents the position in the input image 101. In this case, the depth value in the depth data 102 of a pixel nearest the position represented by the coordinate data is set as the reference value 103. Alternatively, the reference subject 1801 may be coordinate data of the four corners of a rectangular partial area in the input image 101. In this case, the average value of the depth values in the depth data 102 of one or more pixels included in the partial area represented by coordinate data is set as the reference value 103. The reference subject 1801 is designated by, for example, the user of the image processing apparatus 180 through a user interface and input to the image processing apparatus 180.

With the third embodiment, the reference subject 1801 is designated by an instruction of the user, and the depth value of the reference subject 1801 is set as the reference value 103. For this reason, a sense of depth and a stereoscopic effect are imparted to the user in such a manner that the user watches a subject desired to watch.

Fourth Embodiment

An image processing apparatus according to a fourth embodiment sets the depth value of a reference subject detected from an image as a reference value. Thus, even when there is no instruction of the user, a sense of depth and a stereoscopic effect are imparted to the user in such a manner that the user watches a subject.

Figure 27:
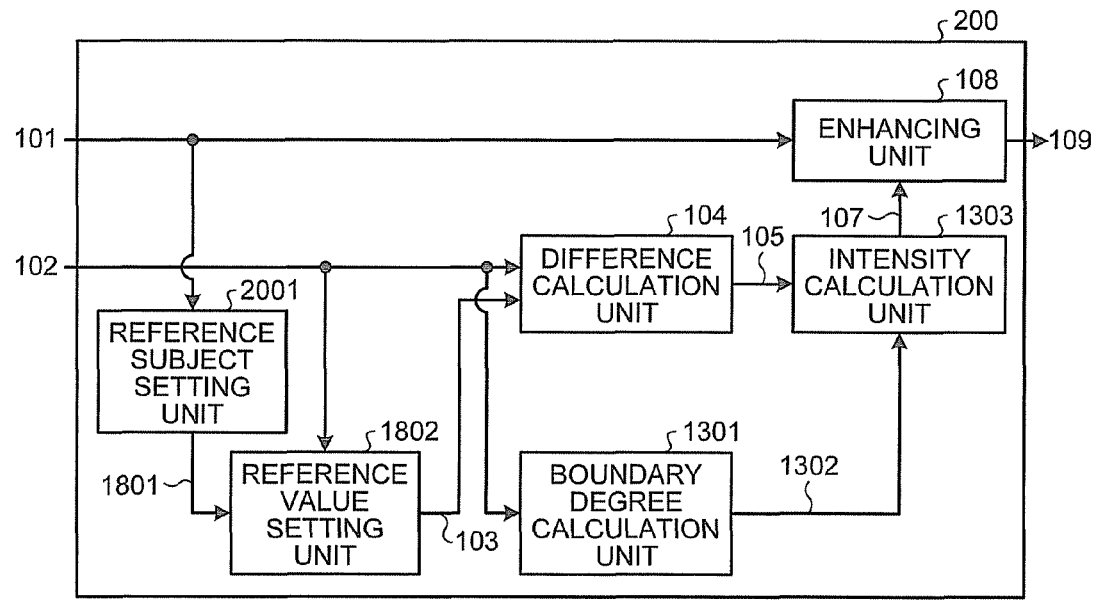
FIG. 27 is a block diagram of an image processing apparatus according to a fourth embodiment.
Figure 28:
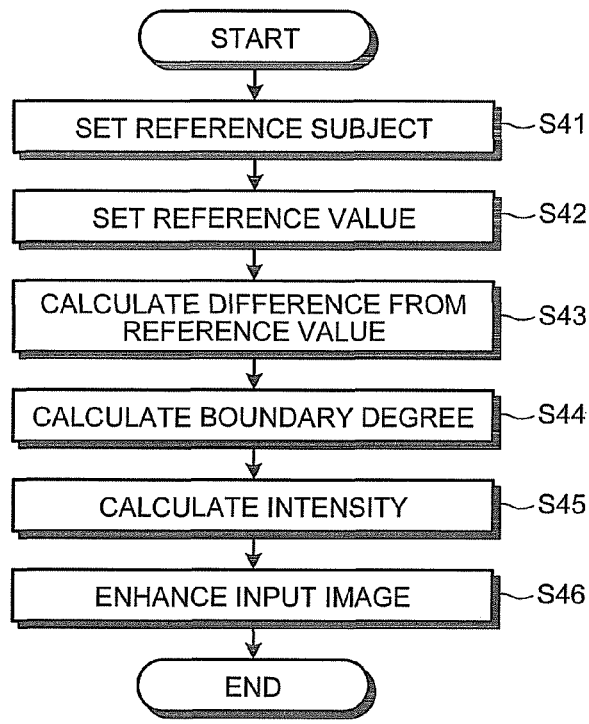
FIG. 28 is a flowchart of image enhancing process in the fourth embodiment.

FIG. 27 is a block diagram showing a configuration example of an image processing apparatus 200 according to a fourth embodiment. FIG. 28 is a flowchart showing the overall flow of an image enhancing process in the fourth embodiment. Hereinafter, the configuration and function of the image processing apparatus 200 will be described with reference to FIGS. 27 and 28.

As shown in FIG. 27, the image processing apparatus 200 includes a reference subject setting unit 2001, a reference value setting unit 1802, a difference calculation unit 104, a boundary degree calculation unit 1301, an intensity calculation unit 1303, and an enhancing unit 108. When an input image 101 and depth data 102 are input, the image processing apparatus 200 outputs an output image 109.

The fourth embodiment is different from the third embodiment in that the reference subject setting unit 2001 is further provided. Other parts and functions are the same as those shown in FIG. 25, which is the block diagram of the image processing apparatus 180 according to the third embodiment. Thus, the same parts are represented by the same reference numerals, and description thereof will not be repeated.

The reference subject setting unit 2001 detects the face of a character or the like from the input image 101 through a face detection process, and sets the detected face or a subject including the detected face as a reference subject 1801.

As shown in FIG. 28, in Step S41, when the input image 101 is input to the reference subject setting unit 2001, the reference subject setting unit 2001 detects a face from the input image 101 and sets the face as the reference subject 1801. The reference subject 1801 is, for example, coordinate data of the four corners of a rectangle representing the region of a face detected from the input image 101 through face detection. The set reference subject 1801 is sent to the reference value setting unit 1802. Steps S42 to S46 are the same as Steps S31 to S35 of FIG. 26, thus description thereof will not be repeated.

As described above, with the fourth embodiment, the region of a face of a character can be set as the reference subject 1801. For this reason, even when there is no instruction of the user, a sense of depth and a stereoscopic effect are imparted to the user in such a manner that the user watches the face.

Modification 1 Relating to Reference Subject

When there are a plurality of faces in the input image 101, coordinate data of the four corners of a rectangle representing the region of a face of maximum size may be set as the reference subject 1801. Thus, even when there is no instruction of the user, a sense of depth and a stereoscopic effect are imparted to the user in such a manner that the user watches a face of maximum size.

Modification 2 Relating to Reference Subject

When there are a plurality of faces in the input image 101, coordinate data of the four corners of a rectangle representing the region of a sharpest face may be set as the reference subject 1801. The degree of sharpness is, for example, power of a high-frequency component calculated through frequency analysis. Thus, even when there is no instruction of the user, a sense of depth and a stereoscopic effect are imparted to the user in such a manner that the user watches a sharpest face.

Modification 3 Relating to Reference Subject

A camera may be further provided in the reference subject setting unit 2001, detects a user's gaze direction through a gaze detection process from a image captured by the camera. Coordinate data of a position which is watched by the user may be calculated, and the calculated coordinate data may be set as the reference subject 1801. Thus, a region which is actually watched by the user is enhanced strongest, such that a sense of depth and a stereoscopic effect are imparted to the user in such a manner that the user watches the region.

Modification 4 Relating to Reference Subject

The input image 101 may be a plurality of parallax images. A parallax image is an image which is viewed from a plurality of viewpoints having parallax. The reference subject setting unit 2001 sets a region where there is no parallax between parallax images respectively entering the right eye and the left eye from a viewpoint to be supposed (a region where parallax is smaller than a predetermined threshold value) as the reference subject 1801. The enhancing unit 108 enhances at least one of the brightness and saturation of at least one of a plurality of parallax images (input image 101) on the basis of intensity data 107 to generate the output image 109.

Figure 29:
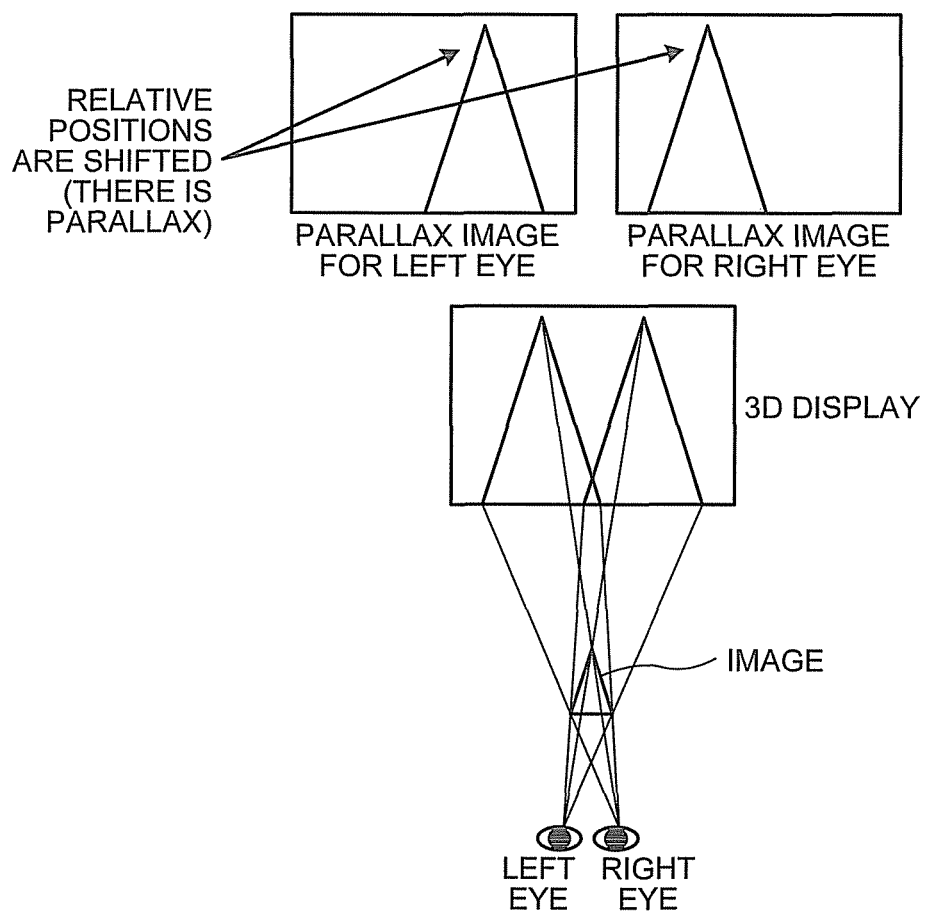
FIG. 29 is a diagram showing an example where a subject is viewed to be popped out from a 3D display.

The effects when a region where there is no parallax is set as the reference subject 1801 will be described in connection with an example where the input image 101 is a binocular parallax image. FIG. 29 is a diagram showing an example where a triangle serving as a subject is viewed to be popped out in front of a 3D display. In this example, there is a shift in the relative position between a triangle in the parallax image for the right eye and a triangle in the parallax image for the left eye, that is, there is parallax. For this reason, a triangular image is viewed to be popped out at a position where a line which connects the right eye and the triangle in the parallax image for the right eye crosses a line which connects the left eye and the triangle in the parallax image for the left eye.

Figure 30:
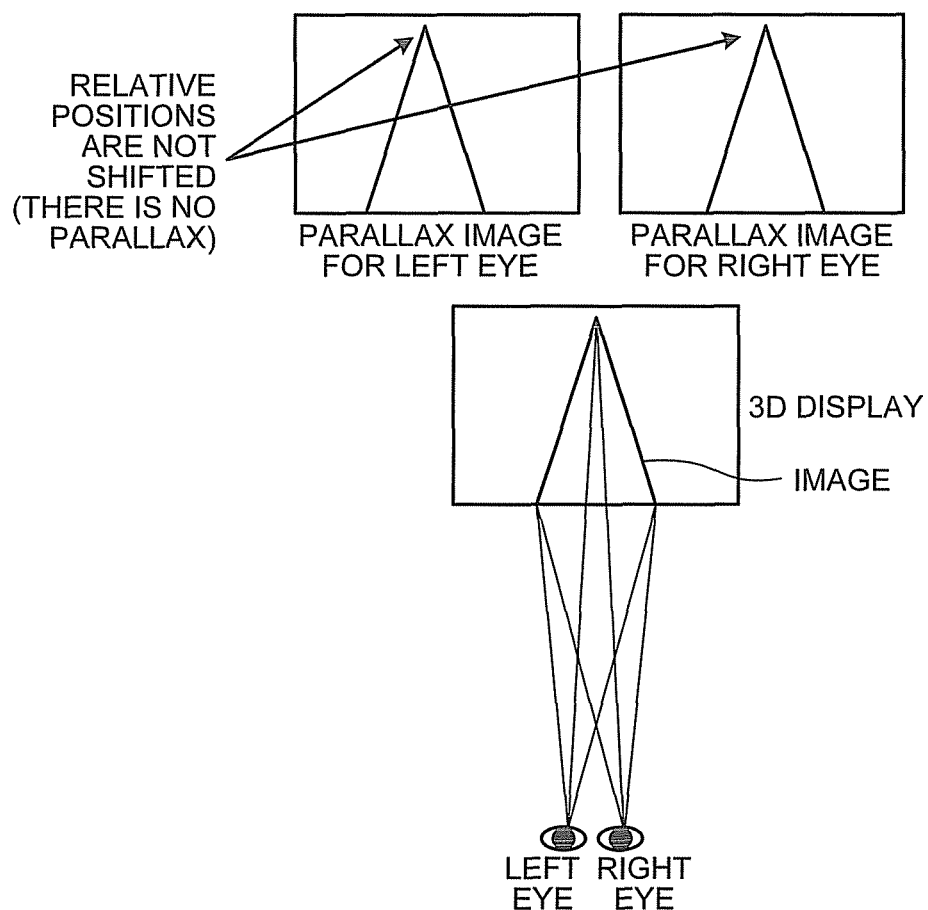
FIG. 30 is a diagram showing an example where a subject is viewed on the surface of a 3D display.

FIG. 30 is a diagram showing an example where a triangle serving as a subject is viewed on the surface of a 3D display. In this reason, there is no shift in the relative position between a triangle in the parallax image for the right eye and a triangle in the parallax image for the left eye, that is, there is no parallax. For this reason, a line which connects the right eye and the triangle serving as a subject in the parallax image for the right eye crosses a line which connects the left eye and the triangle serving as a subject in the parallax image for the left eye on the surface of the display, and the triangle is viewed in such a manner to be present on the surface of the display.

As shown in FIG. 30, the image of a subject with no shift in the relative position (parallax) is observed on the surface of the display. If there is a large amount of a subject which is popped out, a burden is imposed on the eyes of the human being. For this reason, it is considered that a producer of video contents creates a plurality of parallax images such that the image of a subject desired to be watched is generated on the surface of the display. Therefore, with this modification, a region where there is no parallax is set as the reference subject 1801, so that a subject which the producer of video contents desires to be watched is enhanced.

As described above, according to the first to fourth embodiments, an image is enhanced with stronger intensity for a pixel having a depth closer to a depth (reference value) as a reference. Therefore, it is possible to generate an image in which a subject at a depth close to the reference value is distinctively (clearly) visible, making it possible to impart a sense of depth and a stereoscopic effect to a person who views the generated image when the person watches a subject.

Figure 31:
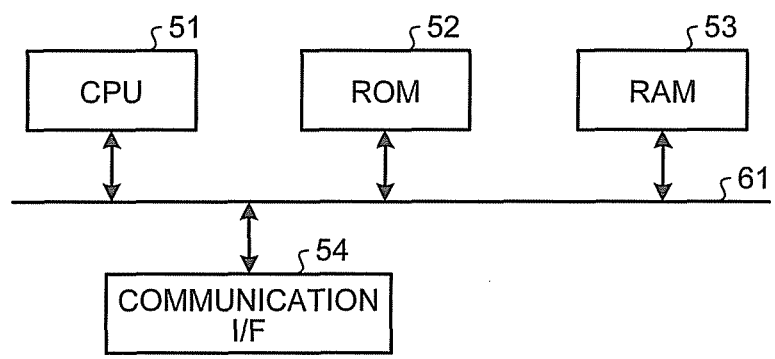
FIG. 31 is a hardware configuration diagram of the image processing apparatus according to each of the first to fourth embodiments.

Next, the hardware configuration of the image processing apparatus according to each of the first to fourth embodiments will be described with reference to FIG. 31. FIG. 31 is an explanatory view showing the hardware configuration of the image processing apparatus according to each of the first to fourth embodiments.

The image processing apparatus according to each of the first to fourth embodiments includes a control device, such as a Central Processing Unit (CPU) 51, a storage device, such as a Read Only Memory (ROM) 52 or a Random Access Memory (RAM) 53, a communication I/F 54 which is connected to a network and performs communication, an external storage device, such as an Hard Disk Drive (HDD) or a Compact Disc (CD) drive device, a display device, such as a display, an input device, such as a keyboard or a mouse, and a bus 61 which connects the units. The image processing apparatus has a hardware configuration in which a typical computer is used.

An image processing program which is executed in the image processing apparatus according to each of the first to fourth embodiments is recorded on a computer-readable medium, such as a Compact Disk Read Only Memory (CD-ROM), a flexible disk (FD), a Compact Disk Recordable (CD-ROM), or a Digital Versatile Disk (DVD), in an installable format or executable format and provided as a computer program product.

The image processing program which is executed in the image processing apparatus according to each of the first to fourth embodiments may be stored in a computer connected to a network, such as Internet, and downloaded through the network. The image processing program which is executed in the image processing apparatus according to each of the first to fourth embodiments may be provided or distributed through a network, such as Internet.

The image processing program of each of the first to fourth embodiments may be embedded in a ROM or the like in advance and provided.

The image processing program which is executed in the image processing apparatus according to each of the first to fourth embodiments may be configured as a module including the above-described units (the difference calculation unit, the intensity calculation unit, and the enhancing unit). As actual hardware, the CPU 51 (processor) reads the image processing program from the storage device and executes the image processing program, such that the above-described units are loaded and generated on a main storage device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
 a difference calculation unit that calculates, for each partial area of an input image, a first difference between a depth value of a subject and a reference value representing a depth as a reference;
 an intensity calculation unit that calculates, for each partial area, an intensity, the intensity being greater as an absolute value of the first difference approaches zero;
 an enhancing unit that enhances each partial area according to the intensity to generate an output image; and
 a boundary degree calculation unit that calculates for each partial area a boundary degree, which has a greater value as a second difference between a depth value of the partial area and a depth value of a peripheral area of the partial area becomes greater,
 wherein the intensity calculation unit calculates for each partial area the intensity that becomes greater as an absolute value of the first difference approaches zero and becomes greater as the boundary degree becomes smaller.

2. An image processing apparatus comprising:
 a difference calculation unit that calculates, for each partial area of an input image, a first difference between a depth value of a subject and a reference value representing a depth as a reference;
 an intensity calculation unit that calculates for each partial area an intensity, the intensity being greater as an absolute value of the first difference approaches zero; and
 an enhancing unit that enhances each partial area according to the intensity to generate an output image
 wherein the intensity calculation unit calculates a first intensity that is smaller than a second intensity, the first intensity being the intensity of the partial area of which depth value indicates ahead of the reference value, the second intensity being the intensity of the partial area of which depth value indicates behind the reference value, the two partial areas having the same absolute value of the difference.

3. The apparatus according to claim 1, further comprising a reference value setting unit that sets the depth value of a reference subject designated as a reference out of subjects in the input image as the reference value.

4. The apparatus according to claim 3, further comprising a subject setting unit that sets a subject designated by a user, sets a subject relating to a face detected from the input image by using a face detection process, or a subject along a gaze direction by using a gaze detection process, as the reference subject,
 wherein the reference value setting unit sets the depth value of the reference subject set by the subject setting unit as the reference value.

5. The apparatus according to claim 3, wherein the input image is a plurality of parallax images, and
 the image processing apparatus further includes:
 a subject setting unit that sets an imaged subject in an area where a parallax between the parallax images is smaller than a predefined threshold value, as the reference subject, and
 the reference value setting unit sets the depth value of the reference subject set by the subject setting unit as the reference value.

6. The apparatus according to claim 1, wherein the intensity calculation unit calculates the intensity corresponding to the difference for each partial area on the basis of a table in which the difference and the intensity are associated with each other.

7. The apparatus according to claim 1, wherein
 the intensity calculation unit calculates a first intensity that is smaller than a second intensity, the first intensity being the intensity of the partial area of which depth value indicates ahead of the reference value, the second intensity being the intensity of the partial area of which depth value indicates behind the reference value, the two partial areas having the same absolute value of the difference.

8. The apparatus according to claim 2, further comprising a reference value setting unit that sets the depth value of a reference subject designated as a reference out of subjects in the input image as the reference value.

9. The apparatus according to claim 8, further comprising a subject setting unit that sets a subject designated by a user, sets a subject relating to a face detected from the input image by using a face detection process, or sets a subject along a gaze direction by using a gaze detection process, as the reference subject,
 wherein the reference value setting unit sets the depth value of the reference subject set by the subject setting unit as the reference value.

10. The apparatus according to claim 8, wherein the input image is a plurality of parallax images, and
 the image processing apparatus further includes:
 a subject setting unit that sets an imaged subject in an area where a parallax between the parallax images is smaller than a predefined threshold value, as the reference subject, and
 the reference value setting unit sets the depth value of the reference subject set by the subject setting unit as the reference value.

11. The apparatus according to claim 2, wherein the intensity calculation unit calculates the intensity corresponding to the difference for each partial area on the basis of a table in which the difference and the intensity are associated with each other.

12. An image processing apparatus comprising:
a processing circuit that
> calculates, for each partial area of an input image, a first difference between a depth value of a subject and a reference value representing a depth as a reference;
> calculates for each partial area an intensity, the intensity being greater as an absolute value of the first difference approaches zero;
> enhances each partial area according to the intensity to generate an output image; and
> calculates, for each partial area, a boundary degree, which has a greater value as a second difference between a depth value of the partial area and a depth value of a peripheral area of the partial area becomes greater,
> wherein the processing circuit calculates for each partial area the intensity which is greater as the absolute value of the first difference approaches zero and is greater as the boundary degree becomes smaller.

13. The apparatus according to claim 12, wherein
the processing circuit sets the depth value of a reference subject designated as a reference out of subjects in the input image as the reference value.

14. The apparatus according to claim 13, wherein
the processing circuit
> sets a subject designated by a user, sets a subject relating to a face detected from the input image by using a face detection process, or sets a subject along a gaze direction by using a gaze detection process, as the reference subject, and
> sets the depth value of the reference subject as the reference value.

15. The apparatus according to claim 13, wherein the input image is a plurality of parallax images, and
the processing circuit
> sets an imaged subject in an area where a parallax between the parallax images is smaller than a predefined threshold value, as the reference subject, and
> sets the depth value of the reference subject as the reference value.

16. The apparatus according to claim 12, wherein the processing circuit calculates the intensity corresponding to the difference for each partial area on the basis of a table in which the difference and the intensity are associated with each other.

* * * * *